(12) United States Patent
Sato

(10) Patent No.: US 11,209,305 B2
(45) Date of Patent: Dec. 28, 2021

(54) ELECTRONIC SCALE DISPLAYING AN OBJECT TO BE WEIGHED AND THE MEASURED WEIGHT OF THE OBJECT

(71) Applicant: DSi Corporation, Tokyo (JP)

(72) Inventor: Hiroshi Sato, Tokyo (JP)

(73) Assignee: DSi Corporation, Tokyo (JP)

( * ) Notice: Subject to any disclaimer, the term of this patent is extended or adjusted under 35 U.S.C. 154(b) by 122 days.

(21) Appl. No.: 16/498,628

(22) PCT Filed: Mar. 27, 2018

(86) PCT No.: PCT/JP2018/012472
§ 371 (c)(1),
(2) Date: Sep. 27, 2019

(87) PCT Pub. No.: WO2018/181339
PCT Pub. Date: Oct. 4, 2018

(65) Prior Publication Data
US 2021/0063236 A1    Mar. 4, 2021

(30) Foreign Application Priority Data

Mar. 30, 2017 (JP) .............................. JP2017-068130

(51) Int. Cl.
*G01G 21/28* (2006.01)
*G01G 23/30* (2006.01)
(Continued)

(52) U.S. Cl.
CPC .............. *G01G 23/35* (2013.01); *G01G 21/28* (2013.01); *G01G 21/30* (2013.01); *G01G 23/30* (2013.01)

(58) Field of Classification Search
CPC ........ G01G 21/28; G01G 21/30; G01G 23/01; G01G 23/30; G01G 23/35
See application file for complete search history.

(56) References Cited

U.S. PATENT DOCUMENTS 4,862,979 A   9/1989 Borchard
6,833,515 B1 * 12/2004 Kesselman ............ G01G 21/28
                                                                  177/126
(Continued)

FOREIGN PATENT DOCUMENTS

CN   102155978 A    8/2011
CN   102778277 A   11/2012
(Continued)

OTHER PUBLICATIONS

The Notification of the First Office Action dated Dec. 14, 2020 in Chinese Patent Application No. 201880022647 (9 pages) with an English translation (12 pages).
(Continued)

*Primary Examiner* — Randy W Gibson
(74) *Attorney, Agent, or Firm* — Faegre Drinker Biddle & Reath LLP

(57) ABSTRACT

An electronic scale includes: a scale body that has a top surface provided with a weighing tray on which an object to be weighed is to be laid and a display portion which displays a weight of the object to be weighed; and a lid member that is capable of closing the top surface of the scale body and that is capable of opening and closing. A camera that images the top surface of the scale body including the weighing tray and the display portion is provided on the lid member. Alternatively, the camera is provided on the top surface of the scale body and the lid member includes reflection means that reflects an image of the top surface of the scale body including the weighing tray and the display portion toward the camera when the lid member opens, on a surface of the lid member that faces the scale body. The electronic scale is capable of simultaneously imaging the object to be weighed and the displayed weight of the same and eliminates need for a special support structure to support the camera for imag- (Continued)

ing, and the top surface of the scale body can be closed when the electronic scale is not in use.

20 Claims, 3 Drawing Sheets

(51) Int. Cl.
*G01G 23/35* (2006.01)
*G01G 21/30* (2006.01)

(56) References Cited

U.S. PATENT DOCUMENTS

| | | | | |
|---|---|---|---|---|
| 6,844,507 B2 * | 1/2005 | Leisinger | ............... | G01G 23/30 |
| | | | | 177/180 |
| 7,423,226 B2 * | 9/2008 | Rotach | ................... | G01G 23/30 |
| | | | | 177/180 |
| 8,044,308 B2 * | 10/2011 | Kusumoto | ............ | G01G 23/01 |
| | | | | 177/210 EM |
| 9,366,588 B2 * | 6/2016 | Lee | ...................... | G01G 19/414 |
| 9,523,603 B2 * | 12/2016 | Feldotte | ............... | G01G 21/286 |
| 11,099,057 B2 * | 8/2021 | Madadin | ................... | G06T 7/62 |
| 2004/0003947 A1 | 1/2004 | Kesselman et al. | | |
| 2004/0035614 A1 * | 2/2004 | Zhang | .................... | G01G 21/22 |
| | | | | 177/180 |
| 2010/0236841 A1 * | 9/2010 | Kusumoto | ........... | G01G 21/244 |
| | | | | 177/210 EM |
| 2013/0256041 A1 * | 10/2013 | Collins, Jr. | ........ | G01G 19/4144 |
| | | | | 177/2 |
| 2013/0333957 A1 | 12/2013 | Feldotte et al. | | |
| 2014/0063180 A1 | 3/2014 | Sharma | | |
| 2018/0164147 A1 * | 6/2018 | Liebsch | .................... | B01L 1/04 |
| 2020/0386609 A1 * | 12/2020 | Sato | ........................ | G01G 23/32 |

FOREIGN PATENT DOCUMENTS

| | | |
|---|---|---|
| CN | 102818609 A | 12/2012 |
| CN | 205300742 U | 6/2016 |
| EP | 2671056 A1 | 12/2013 |
| JP | S56-82530 U | 7/1981 |
| JP | 2005-010100 A | 1/2005 |
| JP | 2011-012994 A | 1/2011 |
| JP | 2013-160704 A | 8/2013 |
| JP | 2014-167388 A | 9/2014 |
| JP | 2016-47223 A | 4/2016 |
| JP | 2016-176818 A | 10/2016 |
| KR | 2010-0117450 A | 11/2010 |
| WO | WO-2006/095850 A1 | 9/2006 |
| WO | WO-2014/034683 A1 | 3/2014 |

OTHER PUBLICATIONS

Extended European Search Report dated Nov. 24, 2020 in European Patent Application No. 18776823.9.

\* cited by examiner

ELECTRONIC SCALE DISPLAYING AN OBJECT TO BE WEIGHED AND THE MEASURED WEIGHT OF THE OBJECT

CROSS REFERENCE TO PRIOR APPLICATIONS

This application is the National Stage of International Application No. PCT/JP2018/012472 filed Mar. 27, 2018 and claims benefit of Japanese Application No. 2017-068130 filed on Mar. 30, 2017, which are herein incorporated by reference in their entirety.

TECHNICAL FIELD

The present invention relates to an electronic scale that measures a weight of an object to be weighed such as a precious metal product and that displays the measured weight of the object to be weighed.

BACKGROUND ART

Conventionally, various electronic scales have been known, whose surfaces are provided with weighing trays, which measure weights of objects to be weighed that are laid on the weighing trays, which display the weights of the objects to be weighed, as numerical values, and which include cameras that image the weighing trays.

In Patent Literature 1, for instance, an electronic kitchen scale is disclosed which includes a weighing portion that is provided on a top surface of a scale body, a display portion that displays a weighing result and that is provided on a side surface of the scale body, a camera holding portion that is constructed between upper ends of supports stood on the top surface of the scale body, and a camera that images a tray laid on the weighing portion and that is provided on a bottom surface of the camera holding portion.

In Patent Literature 2, a weighing device is disclosed which includes a weighing tray on which an object to be weighed is to be laid and which is provided on a top surface of a device body, two supports which are stood on the top surface of the device body, a support member which is stretched between upper ends of the supports, a touch panel which is mounted on the support member, and a camera which images the object to be weighed and which is mounted below the touch panel.

PRIOR ART LITERATURE

Patent Literature

[Patent Literature 1] Japanese Patent Application Laid-Open No. 2014-167388
[Patent Literature 2] Japanese Patent Application Laid-Open No. 2016-176818

SUMMARY OF THE INVENTION

Problems to be Solved by the Invention

Both electronic scales disclosed in Patent Literature 1 and Patent Literature 2, however, are capable of imaging the objects to be weighed that are laid on the weighing trays, by the cameras, but are incapable of simultaneously imaging the objects to be weighed and weights of the same.

Though simultaneous imaging of the object to be weighed and the weight makes it possible to demonstrate that the displayed weight is the weight of the object to be weighed, the conventional electronic scales do not have such a function, which is extremely important for the object to be weighed that is an expensive precious metal product or the like, particularly, because prices of such a product greatly differ depending on a weight of the product.

In the conventional electronic scales, lack of a lid member that covers the top surface of the scale body including the weighing tray and a display portion makes the top surface of the scale body prone to become dirty during nonuse and provision of a support structure that is intended to support the camera and that is stood on the scale body makes the electronic scale cumbersome and inconvenient for carriage.

A problem to be solved by the invention is to provide an electronic scale which is capable of simultaneously imaging an object to be weighed and a displayed weight of the same, which eliminates need for a special support structure to support a camera for imaging, and in which a top surface of a scale body may be closed when the electronic scale is not in use.

Means to Solve the Problems

An electronic scale of the present invention includes: a scale body that has a top surface provided with a weighing tray on which an object to be weighed is to be laid and a display portion which displays a weight of the object to be weighed; and a lid member that is capable of closing the top surface of the scale body and that is capable of opening and closing. The lid member is provided with a camera that images the top surface of the scale body including the weighing tray and the display portion.

Alternatively, an electronic scale of the invention includes: a scale body that has a top surface provided with a weighing tray on which an object to be weighed is to be laid, a display portion which displays a weight of the object to be weighed, and a camera; and a lid member that is capable of closing the top surface of the scale body and that is capable of opening and closing. A surface of the lid member that faces the scale body is provided with reflection means that reflects an image of the top surface of the scale body including the weighing tray and the display portion toward the camera when the lid member opens.

The display portion may be capable of displaying a working amount corrected value obtained by multiplication of the weight of the object to be weighed by a predetermined coefficient, and operation of a working amount corrective operation button provided on the scale body may cause the display portion to display the working amount corrected value.

A storage medium for saving of image data resulting from imaging by the camera may be detachably connected to the scale body.

The electronic scale that is an embodiment of the invention may transmit image data resulting from imaging of the top surface of the scale body by the camera and the weight of the object to be weighed, obtained by weighing by the electronic scale, through means of communication to external electronic equipment.

The electronic scale that is an embodiment of the invention may be provided with a lighting system that illuminates the top surface of the scale body.

Effects of the Invention

According to the present invention, the object to be weighed that is laid on the weighing tray and the displayed weight of the object to be weighed can be simultaneously imaged and can be set in a screen, so that the object to be weighed and the weight can be reliably made to correspond to each other and can be clarified.

Closure of the top surface of the scale body with the lid member during nonuse makes the top surface of the scale body resist becoming dirty and provision of the camera on the lid member or the top surface of the scale body eliminates need for provision of a separate support structure to support the camera, so that compactness and convenience for carriage may be attained.

DETAILED DESCRIPTION OF THE EMBODIMENTS

Hereinbelow, embodiments of the present invention will be described in detail based on the drawings.

Figure 1:
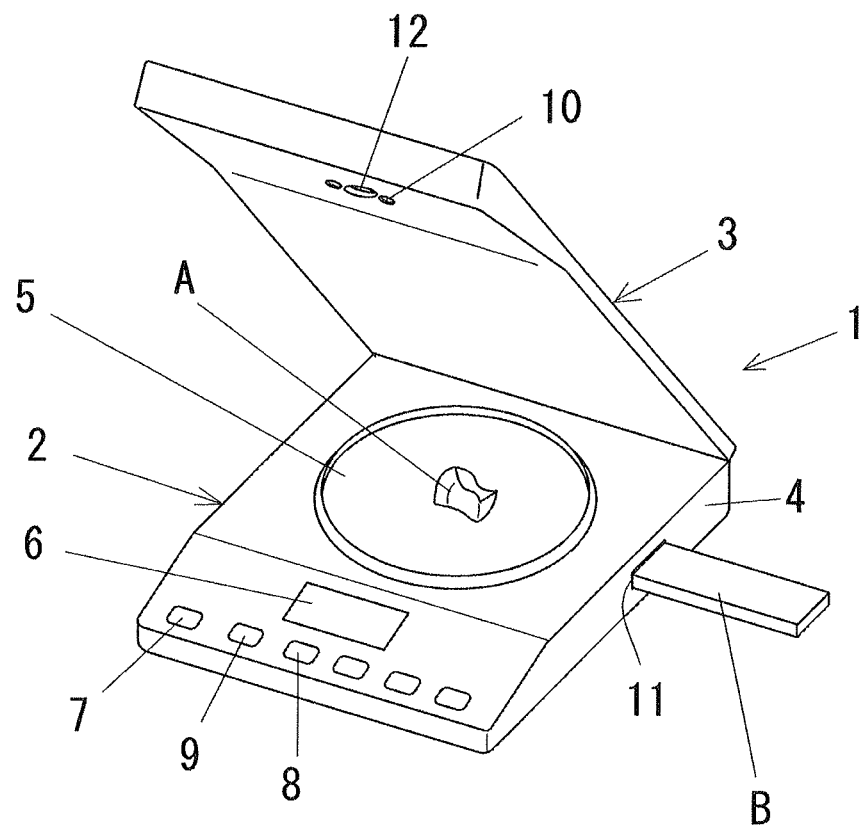
FIG. 1 is a perspective view of an electronic scale having a lid member rising, illustrating embodiment 1 of the invention.
Figure 2:
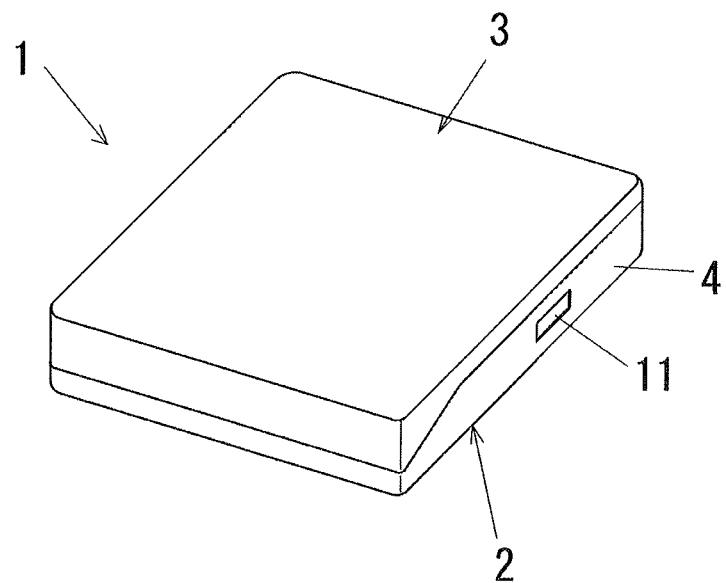
FIG. 2 is a perspective view of the electronic scale having the lid member closing, illustrating embodiment 1 of the invention.
Figure 3:
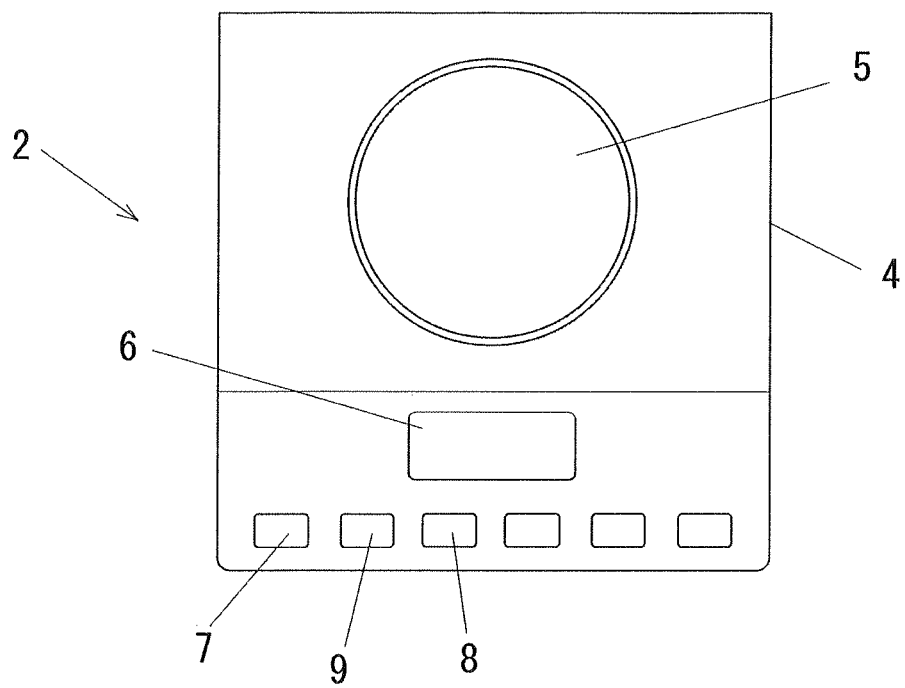
FIG. 3 is a plan view of a scale body according to embodiment 1 of the invention.

FIGS. 1 to 3 illustrate embodiment 1 of the invention.

As illustrated in FIGS. 1 and 2, an electronic scale 1 according to embodiment 1 includes a scale body 2 and a lid member 3 that is capable of closing a top surface of the scale body 2.

Peripheral surfaces of the scale body 2 are covered with a comparatively flat case 4 made of resin and a top surface of the case 4 is provided with a weighing tray 5 on which an object A to be weighed is to be laid, a display portion 6 which displays a weight of the object A to be weighed, and various operation buttons such as an ON/OFF switch 7, a working amount corrective operation button 8, and a reset button 9, as illustrated in FIG. 3.

A weight detection device that measures the weight of the object A to be weighed laid on the weighing tray 5, a control circuit board that includes an operation portion, a storage portion, and the like, a power supply, and the like are incorporated in the case 4, though not illustrated, and a connector 11 for detachable connection of a storage medium B such as a USB memory is provided on a side surface of the case 4 (FIGS. 1 and 2).

The lid member 3 is mounted at one end of the scale body 2 so as to be capable of opening and closing and so as to stop with a click in a state of rising to a predetermined angle.

A camera 12 such as a CCD camera and a lighting system 10 such as an LED are installed on a surface of the lid member 3 that faces the scale body 2. The camera 12 is installed in and at a position and an angle that enable imaging of the top surface of the scale body 2 including the weighing tray 5 and the display portion 6 when the lid member 3 opens to the predetermined angle and stops with a click.

The lighting system 10 automatically emits light when the object A to be weighed is laid on the weighing tray 5 or emits light upon operation of an operation button, and thereby radiates the light toward the top surface of the scale body 2 including the weighing tray 5 and the display portion 6.

Angles of the camera 12 and the lighting system 10 may be adjustable.

When the object A to be weighed is laid on the weighing tray 5 after exposure of the surface of the scale body 2 with the rising of the lid member 3 to the predetermined angle and attainment of drive status with operation of the ON/OFF switch 7, the weight detection device measures the weight of the object A to be weighed and the weight is displayed as numbers on the display portion 6.

Subsequently, the camera 12 images the top surface of the scale body 2 including the weighing tray 5 and the display portion 6 and image data resulting from the imaging by the camera 12 is saved in the storage portion of the control circuit board. The imaging by the camera 12 may be automatically carried out after the weight is displayed on the display portion 6 or may be carried out upon operation of an operation button.

The connection of the storage medium B to the connector 11 of the scale body 2 enables saving in the storage medium B of the image data resulting from the imaging by the camera 12.

The electronic scale 1 may transmit the weight of the object A to be weighed that is a measurement result and the image data resulting from the imaging by the camera 12 to electronic equipment, not illustrated, external to the electronic scale 1 with use of means of communication such as Bluetooth (registered trademark) communication or wifi (registered trademark) communication.

In case where the object A to be weighed is a denture, a filling for a tooth, or the like that is produced by working of expensive precious metal, it is common that a contractor asked for the working informs a client of a value obtained by multiplication of an actual weight by a given coefficient (about 1.05 to 1.15) larger than 1 for the precious metal lost due to the working such as polishing and charges an amount of money corresponding to the weight corrected for a working amount.

Therefore, a configuration is convenient in which operation of the working amount corrective operation button 8 causes the display portion 6 to display the value obtained by the multiplication of the weight of the object A to be weighed, measured by the weight detection device, by the predetermined coefficient, as a working amount corrected value, and causes the camera 12 to image the object A to be weighed on the weighing tray 5 and the weight displayed as the working amount corrected value, because need for troublesome calculation such as the multiplication by the correction coefficient is eliminated.

Figure 4:
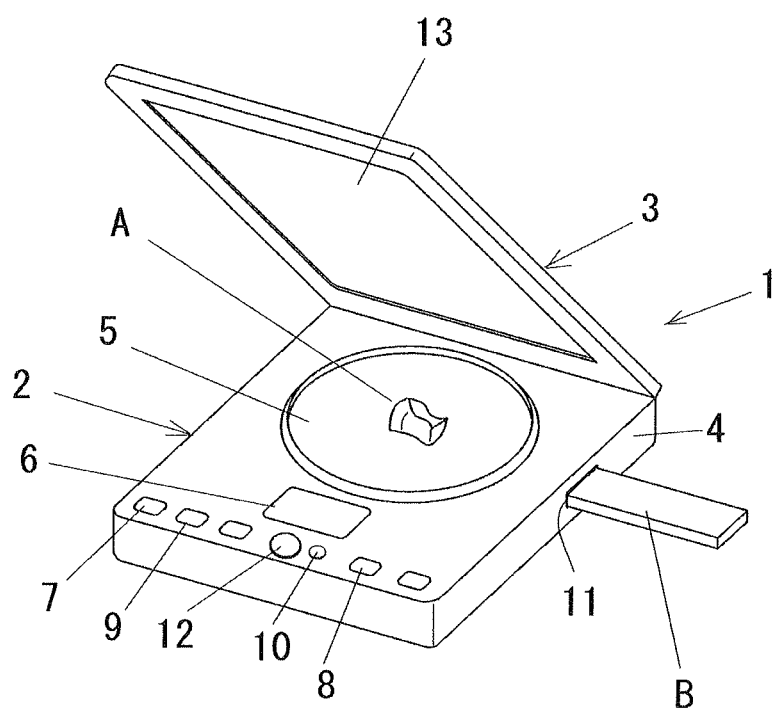
FIG. 4 is a perspective view of an electronic scale having a lid member rising, illustrating embodiment 2 of the invention.

FIG. 4 illustrates embodiment 2 of the invention.

In embodiment 2, the camera 12 and the lighting system 10 are provided on the top surface of the scale body 2.

The lid member 3 includes reflection means 13 that reflects an image of the top surface of the scale body 2 including the weighing tray 5 and the display portion 6 toward the camera 12 when the lid member 3 opens to a predetermined angle, on a surface of the lid member 3 that faces the scale body 2. The reflection means 13 may be a mirror, a metallized layer having high reflectance, or the like, for instance.

Upon the rising of the lid member 3 to the predetermined angle, the operation of the ON/OFF switch 7, and laying of the object A to be weighed on the weighing tray 5, accordingly, the weight of the object A to be weighed is displayed on the display portion 6, the reflection means 13 reflects the image of the top surface of the scale body 2 toward the camera 12, and the camera 12 simultaneously images the object A to be weighed on the weighing tray 5 and the display portion 6 on which the weight is displayed.

For a reason that the other configurations and the other methods of use are the same as those of the embodiment illustrated in FIGS. 1 to 3, identical parts are provided with common reference characters and detailed description thereof is omitted.

Image processing in which an image resulting from the imaging as a mirror image is inverted for improvement in visibility may be carried out.

DESCRIPTION OF REFERENCE NUMERALS

A object to be weighed
B storage medium
1 electronic scale
2 scale body
3 lid member
4 case
5 weighing tray
6 display portion
7 ON/OFF switch
8 working amount corrective operation button
9 reset button
10 lighting system
11 connector
12 camera
13 reflection means

What is claimed is:

1. An electronic scale comprising:
    a scale body that has a top surface provided with a weighing tray on which an object to be weighed is to be laid and a display portion which displays a weight of the object to be weighed; and
    a lid member that is capable of closing the top surface of the scale body and that is capable of opening and closing, wherein
    the lid member is provided with a camera that images the top surface of the scale body including the weighing tray and the display portion.

2. The electronic scale according to claim 1, wherein the display portion is capable of displaying a value obtained by multiplication of the weight of the object to be weighed by a predetermined coefficient, as a working amount corrected value, and operation of a working amount corrective operation button provided on the scale body causes the display portion to display the working amount corrected value.

3. The electronic scale according to claim 1, wherein a storage medium for saving of image data resulting from imaging by the camera is detachably connected to the scale body.

4. The electronic scale according to claim 1, wherein the electronic scale is configured to transmit image data resulting from imaging of the top surface of the scale body by the camera and the weight of the object to be weighed to external electronic equipment.

5. An electronic scale comprising:
    a scale body that has a top surface provided with a weighing tray on which an object to be weighed is to be laid, a display portion which displays a weight of the object to be weighed, and a camera; and
    a lid member that is capable of closing a surface of the scale body and that is capable of opening and closing, wherein
    the lid member includes reflection means that reflects an image of the top surface of the scale body including the weighing tray and the display portion toward the camera when the lid member opens, on a surface of the lid member that faces the scale body.

6. The electronic scale according to claim 5, wherein the display portion is capable of displaying a working amount corrected value obtained by multiplication of the weight of the object to be weighed by a predetermined coefficient, and operation of a working amount corrective operation button provided on the scale body causes the display portion to display the working amount corrected value.

7. The electronic scale according to claim 5, wherein a storage medium for saving of image data resulting from imaging by the camera is detachably connected to the scale body.

8. The electronic scale according to claim 5, wherein the electronic scale is configured to transmit image data resulting from imaging of the top surface of the scale body by the camera and the weight of the object to be weighed to external electronic equipment.

9. The electronic scale according to claim 1, wherein a lighting system that illuminates the top surface of the scale body is provided on a surface of the lid member that faces the scale body.

10. The electronic scale according to claim 5, wherein a lighting system that illuminates the top surface of the scale body through the reflection means is provided on the top surface of the scale body.

11. The electronic scale according to claim 2, wherein a storage medium for saving of image data resulting from imaging by the camera is detachably connected to the scale body.

12. The electronic scale according to claim 2, wherein the electronic scale is configured to transmit image data resulting from imaging of the top surface of the scale body by the camera and the weight of the object to be weighed to external electronic equipment.

13. The electronic scale according to claim 3, wherein the electronic scale is configured to transmit image data resulting from imaging of the top surface of the scale body by the camera and the weight of the object to be weighed to external electronic equipment.

14. The electronic scale according to claim 6, wherein a storage medium for saving of image data resulting from imaging by the camera is detachably connected to the scale body.

15. The electronic scale according to claim 6, wherein the electronic scale is configured to transmit image data resulting from imaging of the top surface of the scale body by the camera and the weight of the object to be weighed to external electronic equipment.

16. The electronic scale according to claim 7, wherein the electronic scale is configured to transmit image data resulting from imaging of the top surface of the scale body by the camera and the weight of the object to be weighed to external electronic equipment.

17. The electronic scale according to claim 2, wherein a lighting system that illuminates the top surface of the scale body is provided on a surface of the lid member that faces the scale body.

18. The electronic scale according to claim 3, wherein a lighting system that illuminates the top surface of the scale body is provided on a surface of the lid member that faces the scale body.

19. The electronic scale according to claim 6, wherein a lighting system that illuminates the top surface of the scale body through the reflection means is provided on the top surface of the scale body.

20. The electronic scale according to claim 7, wherein a lighting system that illuminates the top surface of the scale body through the reflection means is provided on the top surface of the scale body.

\* \* \* \* \*